United States Patent
Luo et al.

(10) Patent No.: US 9,042,287 B2
(45) Date of Patent: May 26, 2015

(54) METHODS AND APPARATUS FOR IMPROVING NETWORK LOADING

(71) Applicant: QUALCOMM Incorporated, San Diego, CA (US)

(72) Inventors: Tao Luo, San Diego, CA (US); Yongbin Wei, San Diego, CA (US); Rajat Prakash, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 13/663,162

(22) Filed: Oct. 29, 2012

(65) Prior Publication Data

US 2013/0121222 A1 May 16, 2013

Related U.S. Application Data

(60) Provisional application No. 61/559,520, filed on Nov. 14, 2011.

(51) Int. Cl.
| | |
|---|---|
| *H04W 36/04* | (2009.01) |
| *H04W 36/16* | (2009.01) |
| *H04W 36/20* | (2009.01) |
| *H04W 36/06* | (2009.01) |
| *H04W 36/22* | (2009.01) |

(52) U.S. Cl.
CPC ............ *H04W 36/04* (2013.01); *H04W 36/165* (2013.01); *H04W 36/20* (2013.01); *H04W 36/06* (2013.01); *H04W 36/22* (2013.01)

(58) Field of Classification Search
CPC ..... H04W 16/04; H04W 16/08; H04W 16/32; H04W 36/04; H04W 36/08; H04W 36/22; H04W 36/30; H04W 36/165

USPC .......................................................... 370/311
See application file for complete search history.

(56) References Cited

U.S. PATENT DOCUMENTS

| | | | |
|---|---|---|---|
| 6,845,238 | B1 | 1/2005 | Muller |
| 2002/0086675 | A1 | 7/2002 | Mansour |
| 2005/0159158 | A1 | 7/2005 | Pardeep et al. |
| 2006/0166677 | A1 | 7/2006 | Derakshan et al. |

(Continued)

FOREIGN PATENT DOCUMENTS

| | | |
|---|---|---|
| WO | 2009120791 A2 | 10/2009 |
| WO | 2011090310 A2 | 7/2011 |

OTHER PUBLICATIONS

International Search Report and Written Opinion—PCT/US2012/062533—ISA/EPO—Dec. 21, 2012.

(Continued)

*Primary Examiner* — Min Jung
(74) *Attorney, Agent, or Firm* — Patterson & Sheridan, L.L.P.

(57) ABSTRACT

Certain aspects of the present disclosure provide methods, apparatus, and computer-program products for improving network loading (e.g., by enabling inter-frequency handover and/or traffic offloading between neighboring base stations). In aspects, the proposed methods may include transmitting a beacon signal on a frequency (e.g., carrier frequency) other than the frequency currently used by a base station. The base station may select a cell identity (ID) and transmit one or more beacon signals on the frequency using the selected cell ID. The beacon signal may be used to decide whether or not to perform an inter-frequency handover.

52 Claims, 9 Drawing Sheets

(56) References Cited

U.S. PATENT DOCUMENTS

| | | | |
|---|---|---|---|
| 2010/0130210 A1* | 5/2010 | Tokgoz et al. | 455/437 |
| 2010/0151864 A1 | 6/2010 | Mori | |
| 2012/0002643 A1 | 1/2012 | Chung et al. | |
| 2012/0113844 A1* | 5/2012 | Krishnamurthy | 370/252 |
| 2012/0188884 A1* | 7/2012 | Simonsson et al. | 370/252 |
| 2012/0263109 A1* | 10/2012 | Wigard et al. | 370/328 |
| 2012/0263145 A1* | 10/2012 | Marinier et al. | 370/331 |
| 2012/0294214 A1 | 11/2012 | Han et al. | |
| 2014/0135025 A1* | 5/2014 | Yoo et al. | 455/452.1 |

OTHER PUBLICATIONS

"LTE: Evolved Universal terrestrial Radio access (E-UTRA); TDD Home eNode B (HeNB) Radio frequency (RF) requirements analysis (3GPP TR.922 version 10.0.0 Release 10)", technical Report, European Telecommunications Standards Institute (ESTI), 650, Route Des Lucioles ; F-06921 Sophia-Antipolis; France, vol. 3GPP RAN 4, No. V10.0.0, May 1, 2011, XP014065663, pp. 65.

* cited by examiner

US 9,042,287 B2

METHODS AND APPARATUS FOR IMPROVING NETWORK LOADING

CLAIM OF PRIORITY UNDER 35 U.S.C. §119

The present application for patent claims priority to U.S. Provisional Application No. 61/559,520, entitled, "Methods and Apparatus for Improving Network Loading," filed Nov. 14, 2011, and assigned to the assignee hereof and hereby expressly incorporated by reference herein.

BACKGROUND

1. Technical Field

The present disclosure relates generally to communications, and more specifically to methods and apparatus for improving network loading (e.g., by enabling inter-frequency handover) in wireless networks.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, interference due to interfering base stations and/or interfering UEs may degrade performance.

SUMMARY

Certain aspects of the present disclosure provide a method for wireless communications. The method generally includes by a first base station (BS) transmitting on a first frequency, selecting a cell identity (ID) for use in transmitting a beacon signal on a second frequency, wherein the cell ID is selected such that common reference signals (CRSs) transmitted from the first BS on the second frequency will collide with CRSs transmitted from a second BS on the second frequency, and by the first BS, transmitting one or more signals on the second frequency using the cell ID.

Certain aspects of the present disclosure provide an apparatus for wireless communications. The apparatus generally includes means for selecting, by a first base station (BS) transmitting on a first frequency, a cell identity (ID) for use in transmitting a beacon signal on a second frequency, wherein the cell ID is selected such that common reference signals (CRSs) transmitted from the first BS on the second frequency will collide with CRSs transmitted from a second BS on the second frequency, and means for transmitting, by the first BS, one or more signals on the second frequency using the cell ID.

Certain aspects of the present disclosure provide an apparatus for wireless communications. The apparatus generally includes at least one processor and a memory coupled to the at least one processor. The processor is generally configured to select, by a first base station (BS) transmitting on a first frequency, a cell identity (ID) for use in transmitting a beacon signal on a second frequency, wherein the cell ID is selected such that common reference signals (CRSs) transmitted from the first BS on the second frequency will collide with CRSs transmitted from a second BS on the second frequency, and transmit, by the first BS, one or more signals on the second frequency using the cell ID.

Certain aspects of the present disclosure provide a computer program product for wireless communications. The computer program product generally includes a computer-readable medium comprising code for selecting, by a first base station (BS) transmitting on a first frequency, a cell identity (ID) for use in transmitting a beacon signal on a second frequency, wherein the cell ID is selected such that common reference signals (CRSs) transmitted from the first BS on the second frequency will collide with CRSs transmitted from a second BS on the second frequency, and transmitting, by the first BS, one or more signals on the second frequency using the cell ID.

Certain aspects of the present disclosure provide a method for wireless communications. The method generally includes receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency, and performing a hand over from the second BS to the first BS based on the received cell ID.

Certain aspects of the present disclosure provide an apparatus for wireless communications. The apparatus generally includes means for receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency, and means for performing a hand over from the second BS to the first BS based on the received cell ID.

Certain aspects of the present disclosure provide an apparatus for wireless communications. The apparatus generally includes at least one processor and a memory coupled to the at least one processor. The at least one processor is generally configured to receive, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency, and perform a hand over from the second BS to the first BS based on the received cell ID.

Certain aspects of the present disclosure provide a computer program product for wireless communications. The computer program product generally includes a computer-readable medium comprising code for receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency, and performing a hand over from the second BS to the first BS based on the received cell ID.

Numerous other aspects are provided including methods, apparatus, systems, computer program products, and processing systems.

DETAILED DESCRIPTION

Figure 1:
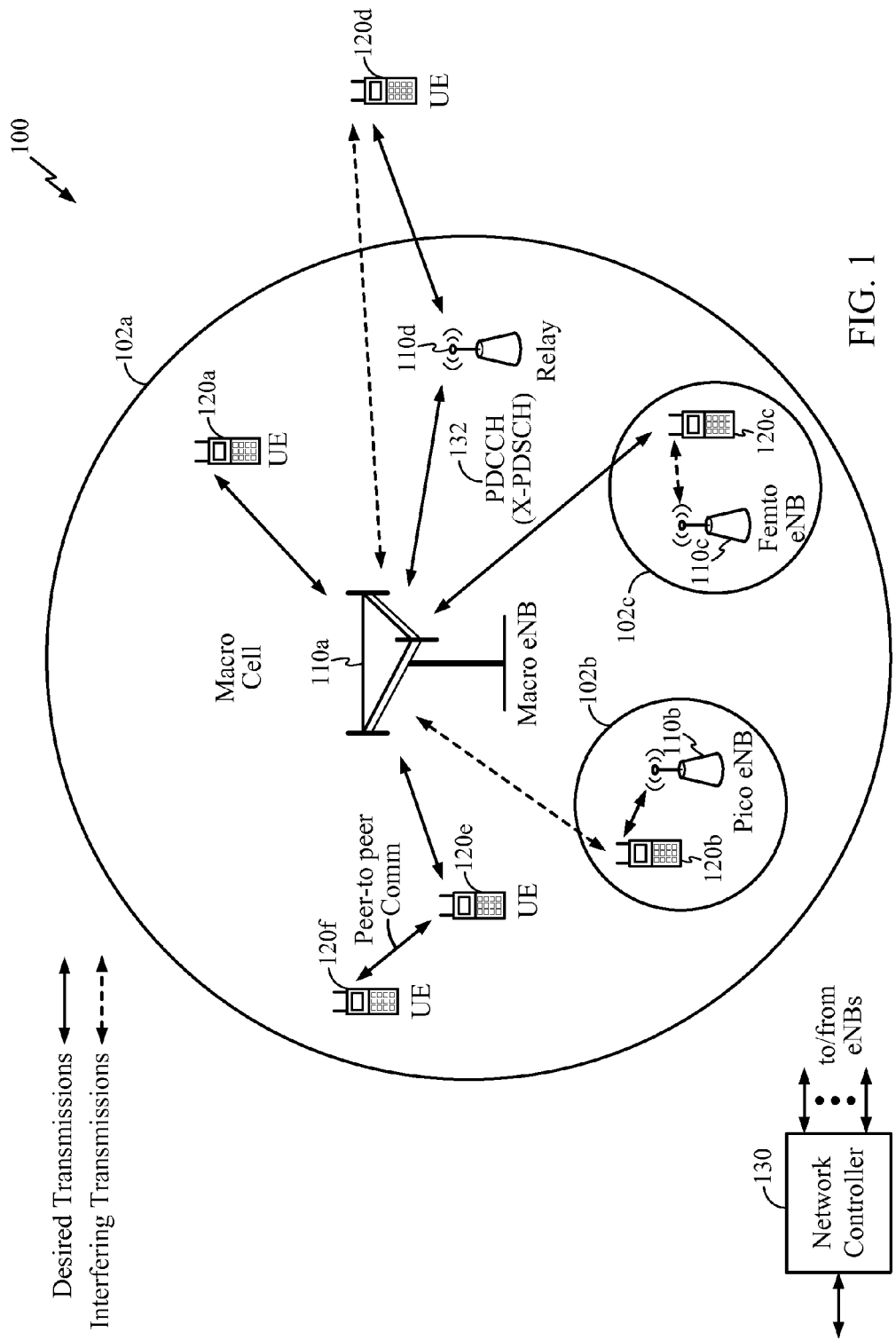
FIG. 1 illustrates an example heterogeneous wireless communications network, in accordance with certain aspects of the present disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

FIG. 1 illustrates an example heterogeneous wireless network 100, in which various aspects of the present disclosure may be practiced. The wireless communication network 100 may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, and the like. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, membership in a subscriber group, and the like. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe, subject to a minimum delay from the previous transmission of the same packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize frequency division duplex (FDD) or time division duplex (TDD). For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2:
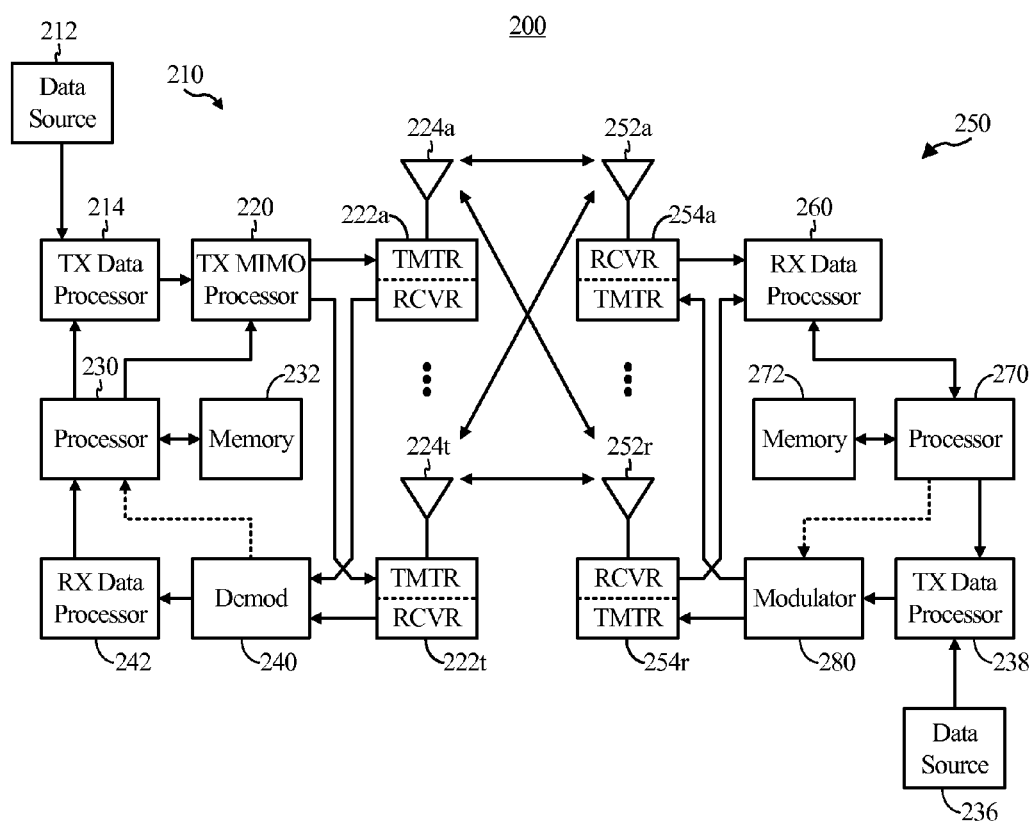
FIG. 2 illustrates a block diagram of example components of an access point and access terminal, in accordance with certain aspects of the present disclosure.

FIG. 2 is a block diagram showing example components of an exemplary base station 210 and access terminal 250 in an example wireless system 200. The base station 210 can be an access point or eNB such as one of the eNBs 110 illustrated in FIG. 1 and the access terminal 250 can be a user equipment such as one of the UEs 120 illustrated in FIG. 1.

At the base station 210, traffic data for a number of data streams is provided from a data source 212 to a transmit (TX) data processor 214. A processor 230 may generate control information to be transmitted to the AT 250.

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, for example, including PDSCH and broadcast signals (which may be protected by careful resource allocation in potentially interfering cells as described herein).

The processing by RX data processor 260 may be complementary to that performed by TX MIMO processor 220 and TX data processor 214 at base station 210. A processor 270, coupled to a memory 272, periodically determines which pre-coding matrix to use. Processor 270 formulates an uplink message comprising a matrix index portion and a rank value portion.

An uplink (reverse link) message may comprise various types of information regarding the communication link and/or the received data stream. The uplink message may then processed by a TX data processor 238, which also receives traffic data for a number of data streams from a data source 236, modulated by a modulator 280, conditioned by transmitters 254a through 254r.

At transmitter system 210, the uplink transmissions from access terminal 250 are received by antennas 224, conditioned by receivers 222, demodulated by a demodulator 240 and processed by a RX data processor 242 to extract the reserve link message transmitted by the access terminal 250. Processor 230 can then determine various parameters, such as which pre-coding matrix to use for determining beamforming weights, and continue processing the extracted message.

Figure 3:
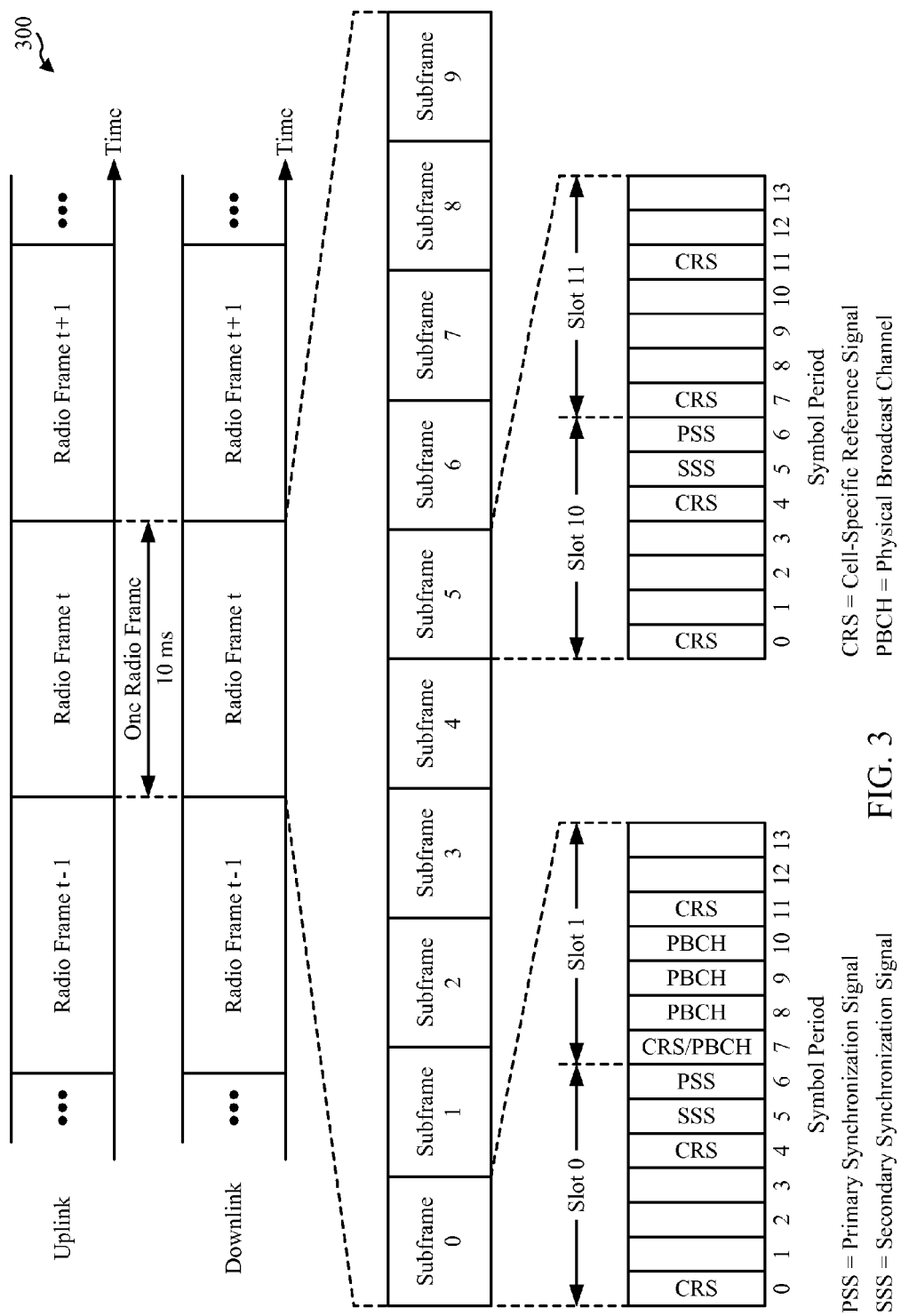
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink (e.g., in the center 1.08 MHz of the system bandwidth) for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may also transmit a cell-specific reference signal (CRS) across the system bandwidth for each cell supported by the eNB. The CRS is also known as a common reference signal. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

Exemplary Method and Apparatus for Improving Network Loading

Certain aspects of the present disclosure propose a method for balancing load of a heterogeneous network. A base station may send one or more beacon signals on a carrier frequency that is used by its neighbor base station using a specially selected cell ID. A UE that is connected to the neighbor base station may receive the beacon signals and possibly handover to the base station that transmitted the beacon signal to reduce the load of its serving base station.

In a heterogeneous network as illustrated in FIG. 1, a macro cell and pico/femto cells may transmit on different carrier frequencies. For example, the macro cell may transmit on carrier frequency F2, when a pico cell transmits on carrier frequency F1. A UE that is coupled (e.g., operatively connected) to one of the cells (e.g., the macro cell) may not search other frequencies when it has good channel conditions. Therefore, the UE may not be aware of other cells (e.g., pico/femto cells) in its vicinity. As a result, the UE may not be offloaded to the neighboring cells (e.g., pico/femto cells) that are transmitting at a frequency different from the frequency of the macro cell.

In order to balance load of different nodes in a heterogeneous network and utilize system resources more efficiently, there may be a need to trigger a UE to perform inter-frequency handover and/or traffic offloading. For example, when a UE that is served by a macro cell moves in the coverage area of a pico cell, it may be desirable for the UE to handover from the macro cell to the pico cell to reduce load of the macro cell. Since the pico cell may operate on a different frequency, the UE may not be aware of the presence of the pico cell.

Certain aspects of the present disclosure present a method that may be performed by a base station (e.g., a pico/femto cell) to enable inter-frequency handover and traffic offloading in a wireless system. The method may include transmitting a beacon signal on a carrier frequency other than the carrier frequency currently used by the base station (BS). The carrier frequency may be used by a neighbor BS (e.g., a macro cell) to communicate with one or more UEs. The BS may select a cell identity (ID) and transmit one or more beacon signals on the carrier frequency using the selected cell ID. The beacon signals may be used to detect presence of the BS in vicinity of the UE. The UE may receive (e.g., with the help of interference cancellation algorithms) the beacon signals from the BS and notify its serving BS (e.g., the macro cell) of presence of the BS in its vicinity. The neighbor BS (e.g., the macro cell) may then decide whether or not the UE should handover to the BS.

The beacon signals that are transmitted on carrier frequencies used by neighboring BSs may include one or more primary synchronization signals (PSSs), secondary synchronization signals (SSSs), physical broadcast channels (PBCHs), common reference signals (CRSs), system information blocks (SIB) or any combination thereof.

Figure 4:
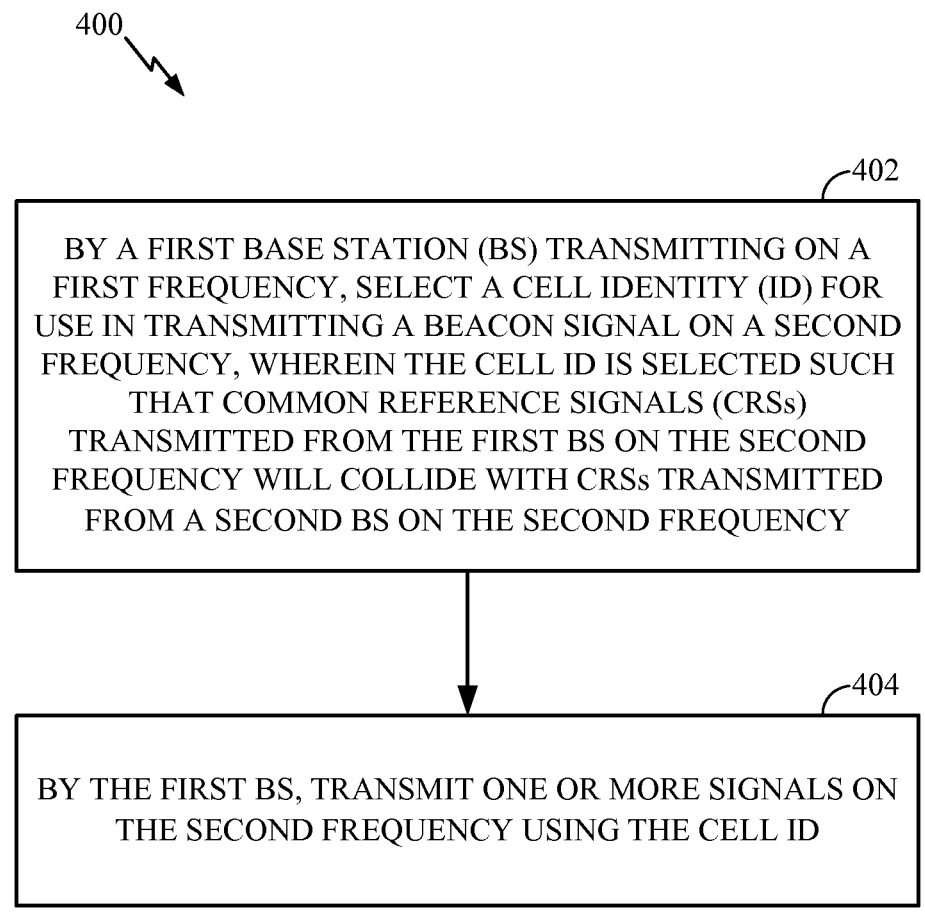
FIG. 4 illustrates example operations that may be performed by a first base station transmitting at a first frequency, in accordance with certain aspects of the present disclosure.

FIG. 4 illustrates example operations 400 that may be performed by a first BS transmitting on a first carrier frequency, in accordance with certain aspects of the present disclosure. The first BS may be a pico base station, a femto base station, or any other type of base station. The operations may begin at 402 by selecting a cell identity (ID) for use in transmitting one or more beacon signals on a second carrier frequency. For example, the cell ID may be selected such that common reference signals (CRSs) transmitted from the first BS on the second carrier frequency will collide with CRSs transmitted from a second BS (e.g., a macro cell) on the second carrier frequency. The second BS may be the strongest neighboring BS that operates on the second carrier frequency, or any other base station. The strongest neighboring BS may be found (or indicated by) based on measured reference signals, primary synchronization signals (PSS), secondary synchronization signals (SSS) and/or a combination thereof that are received from the neighboring BSs. At 404, the base station may transmit one or more beacon signals on the second carrier frequency using the selected cell ID.

In aspects, the first BS may transmit the beacon signal, that may include one or more CRSs, on the second frequency using the selected cell ID. The CRSs in the transmitted beacon signals may collide with the CRSs that are transmitted by the second BS. A UE on the network (e.g., that is associated with the second BS) may receive the beacon signals. The UE may be able to detect presence of the first BS in its vicinity by performing interference cancellation algorithms on the received signals including the collided CRSs that are received from the first and the second BSs. The UE may notify the second BS of presence of the first BS in its vicinity. Based on one or more parameters (e.g., including the notification by the UE) the second BS may decide to offload the UE to the first BS and notify the UE of the inter-frequency handover. The UE may then perform handover procedures with the first BS to handover from the second BS to the first BS. Using this mechanism, one or more UEs may be offloaded from the second BS to other BSs in the heterogeneous network to reduce load on the second BS.

It should be noted that transmitting the beacon signals on the second frequency may cause interference to other devices (e.g., UEs, BSs) that are using the second frequency for communication. However, such interference may be canceled using interference cancellation algorithms if the beacon signals are transmitted as discussed herein.

For certain aspects, the first BS may acquire information about neighboring cells through network listening. The first BS may listen to the signals in the network and perform cell search on other carrier frequencies. Alternatively, the first BS may acquire or receive cell information from other neighboring cells through backhaul network communications. For certain aspects, information about neighboring cells may include physical cell ID of the neighboring cells, timing information and/or carrier frequency information (e.g., frequency error) of those cells and other information.

Based on the neighboring cell information, the first BS may select a cell identity (ID) to use while transmitting beacon signals on the carrier frequency F2. The first BS may identify one or more cell IDs that are currently used by other neighboring BSs and select a cell ID that is different from the identified cell IDs. For certain aspects, the first BS may avoid reusing cell IDs that are already assigned to neighboring cells. This way, the BS ensures unique identification of the BSs in the network.

In the LTE standard, there are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

For certain aspects, the first BS may choose a cell ID which has colliding common reference signal (CRS) with respect to a cell that the first BS can acquire at frequency F2. For example, the first BS may select a cell ID that is spaced apart by 3 from the cell ID of the strongest cell (e.g., the second BS), which may result in collision of the CRSs of the first BS and the second BS.

For certain aspects, the first BS may transmit one or more beacon signals that are synchronized in time and/or in frequency with the strongest cell that the first BS can acquire on frequency F2. For certain aspects, the first BS may transmit one or more beacon signals in a manner to reduce and/or minimize transmit energy. For example, the first BS may utilize multimedia broadcast over single frequency network (MBSFN) subframes for transmission of the one or more signals on carrier frequency F2. The MBSFN subframes may be used to broadcast signals (e.g., data and control) to a plurality of receivers. The MBSFN mode of transmission exploits the OFDM radio interface to send multicast or broadcast data as a multi-cell transmission over a synchronized single frequency network.

For certain aspects, the first BS may transmit beacon signals over frequency F2 periodically or aperiodically. For example, the first BS may transmit one or more beacon signals every t seconds or the first BS may transmit the beacon signals once in a while. In some scenarios, transmission of the beacon signals may be triggered by an event. For example, the first BS may transmit the beacon signals if it detects a UE in its vicinity that is served by another BS.

For certain aspect, the first BS may transmit one or more beacon signals on the second frequency using the selected cell ID, as described herein. A UE on the network (e.g., associated with the second BS) may successfully receive the beacon signals (e.g., by implementing interference cancellation algorithms). If quality of the beacon signals is better than a threshold, the UE may notify its serving BS (e.g., the second BS) of proximity of the first BS and request a handover. If the UE hands over to the first BS, the UE may start communicating with the first BS using the first frequency. It should be noted that transmission of the beacon signals on the second frequency may cause some interference to other devices using the second frequency. However, such interference may be canceled using interference cancellation techniques.

Figure 5:
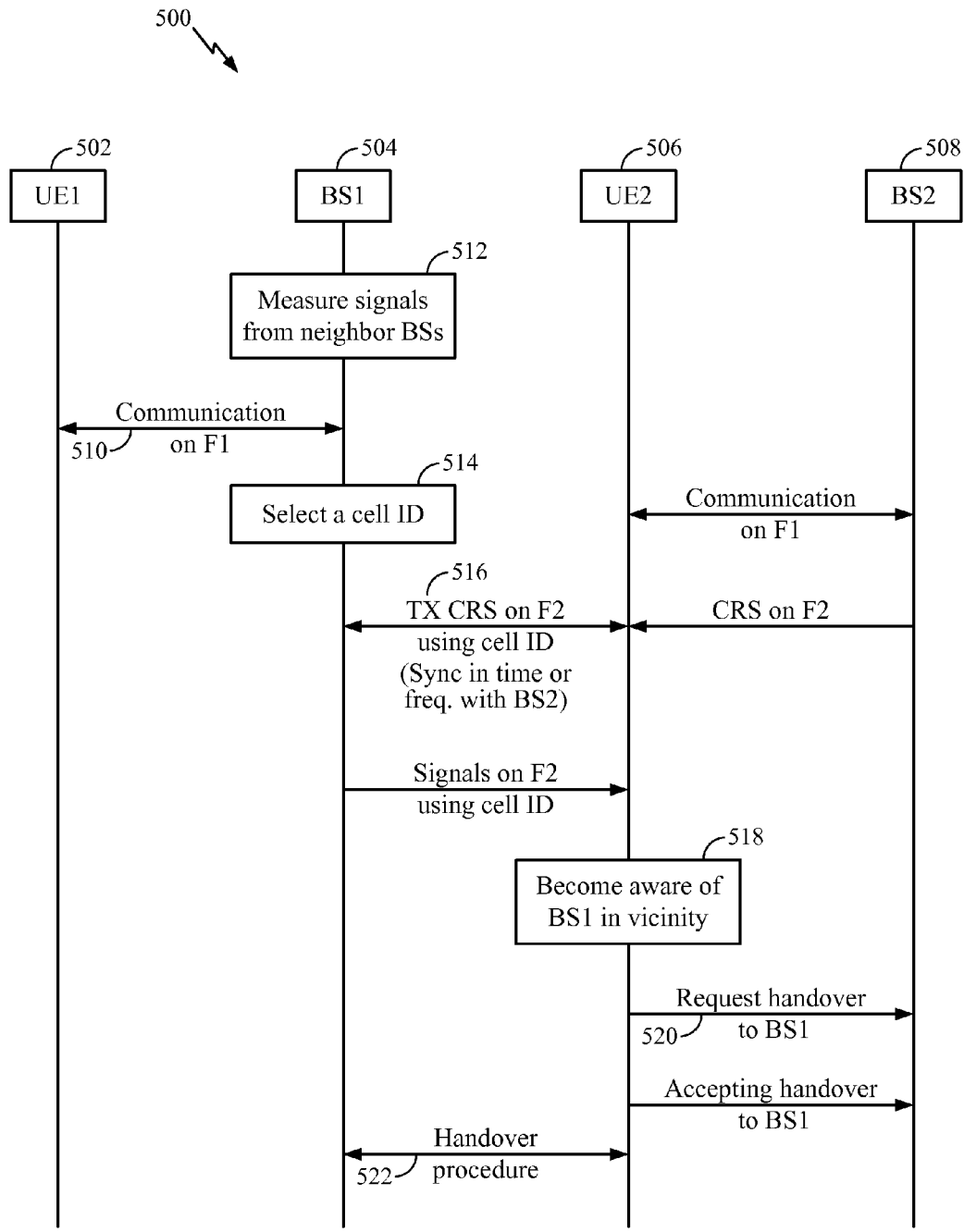
FIG. 5 illustrates example signals that may be exchanged in a network to improve network loading, in accordance with certain aspects of the present disclosure.

FIG. 5 illustrates example signals 500 that may be exchanged in a network to improve network loading, in accordance with certain aspects of the present disclosure. As illustrated in FIG. 5, at 510, user equipment UE1 502 may communicate with the first BS BS1 504 on frequency F1. At 512, BS1 504 may measure signals transmitted by neighboring BSs in the network and select a second BS based on a criteria. For example, BS1 504 may select BS2 508 that has the strongest signal among neighbor BSs. At 514, BS1 may select a cell ID based on the cell ID of BS2 508, as described herein (e.g., such that common reference signals (CRSs) transmitted from BS1 on frequency F2 will collide with CRSs transmitted from BS2). At 516, BS1 504 may transmit one or more signals (e.g., CRS) on frequency F2, which is used by the BS2 508 and UE2 506 to communicate. The transmitted CRS on frequency F2 may collide with the CRS transmitted by BS2 508. The BS1 504 may synchronize with BS2 508 in time or in frequency before transmitting the signals on F2. At 518, UE2 506 may become aware of presence of BS1 504 in its vicinity. If signal quality of the signals received from BS1 is good, at 520, UE2 506 may request to handover from BS2 508 to BS1 504. The BS2 may accept the handover to reduce its load. At 522, the UE2 506 and BS1 504 may start a handover procedure.

Figure 6:
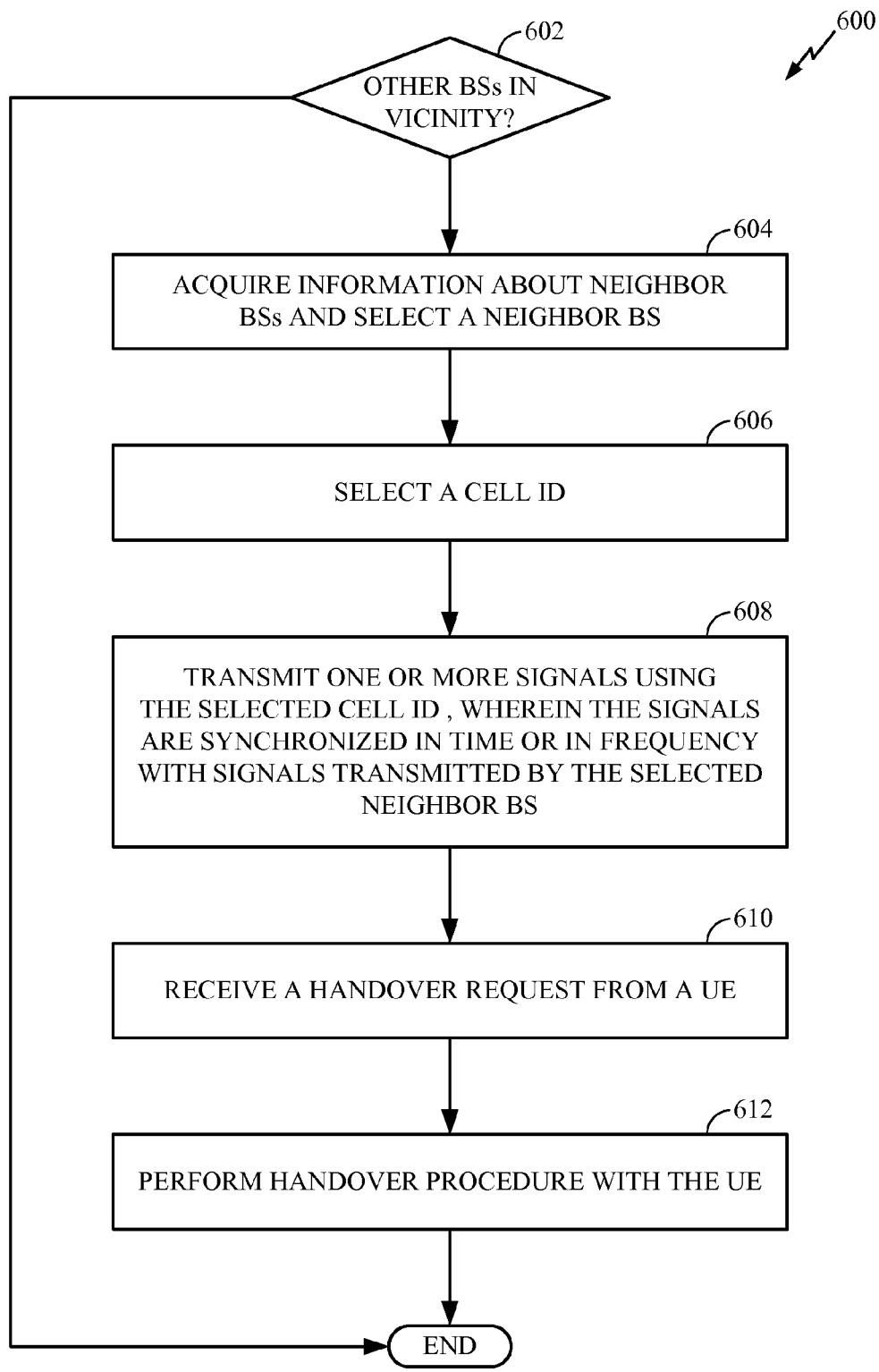
FIG. 6 illustrates an example procedure that may be performed by a base station, in accordance with certain aspects of the present disclosure.

FIG. 6 illustrates an example procedure 600 that may be performed by a base station, in accordance with certain aspects of the present disclosure. At 602, the BS may check whether any other BSs are in its vicinity. If yes, at 604, the BS may acquire information about neighbor BSs and select a neighbor BS which may have the strongest signal. At 606, the BS may select a cell ID such that it collides with the cell IDs of the selected BS. At 608, the BS may transmit one or more signals using the selected cell ID. The transmitted signals may be synchronized in time or in frequency with transmission from the selected BS. At 610, the BS may receive a handover request from a UE. At 612, the BS may perform handover procedure with the UE.

Figure 7:
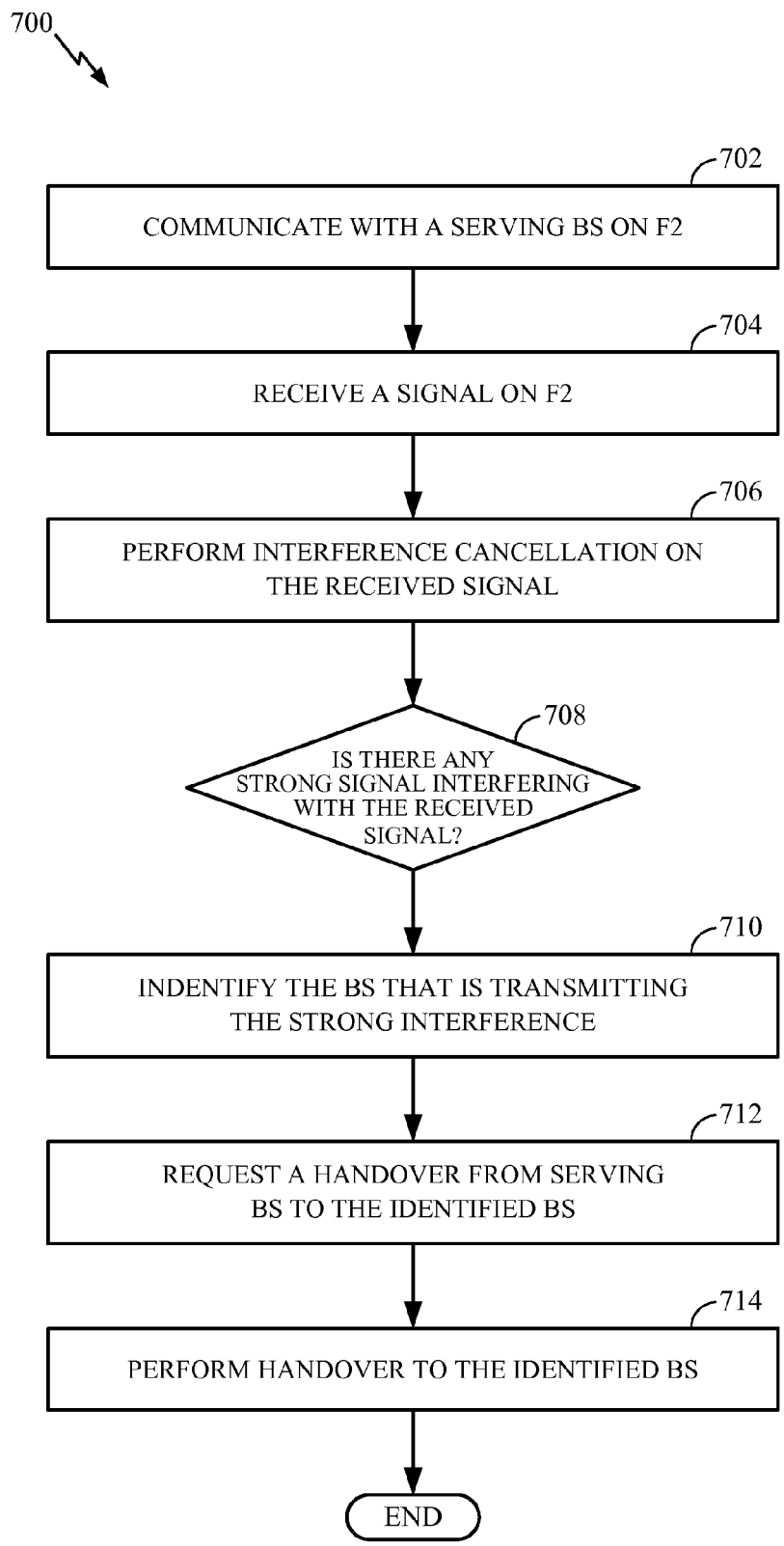
FIG. 7 illustrates an example procedure that may be performed by a UE, in accordance with certain aspects of the present disclosure.

FIG. 7 illustrates an example procedure 700 that may be performed by a UE, in accordance with certain aspects of the present disclosure. At 702, the UE may communicate with a serving BS over frequency F2. At 704, the UE may receive a signal on frequency F2. At 706, the UE may perform interference cancellation on the received signal. In some aspects, at 708, the UE may check to see if there is any strong signal interfering with the received signal. For example, the UE may check if there is any strong interference on the CRS. In some aspects, if yes, at 710, the UE may identify the BS that is transmitting the strong interference. At 712, the UE may request a handover from the serving BS to the BS identified as transmitting the received signal. At 714, if the handover request is accepted, the UE may perform handover procedure with the identified BS.

Figure 8:
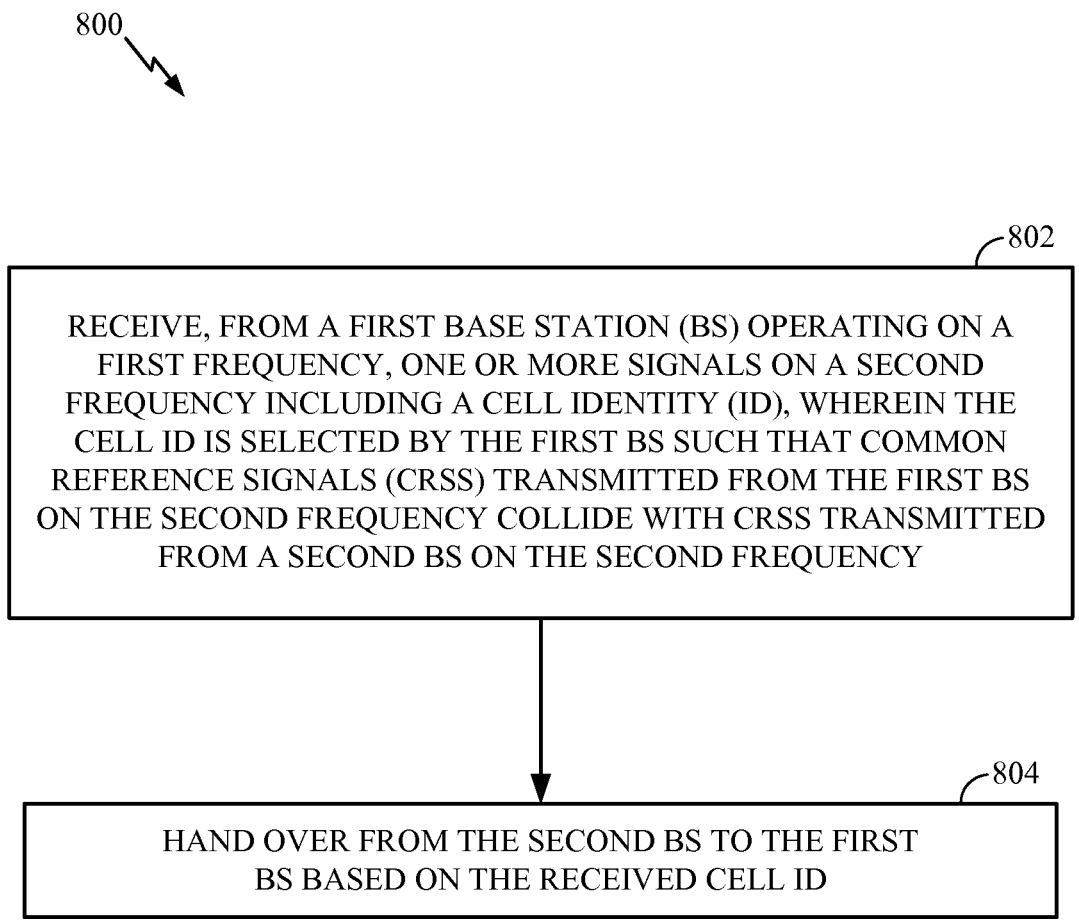
FIG. 8 illustrates example operations that may be performed, for example, by a user equipment to improve network loading, in accordance with certain aspects of the present disclosure.

FIG. 8 illustrates example operations that may be performed, for example, by a user equipment to improve network loading, in accordance with certain aspects of the present disclosure. At 802, the UE may receive from a first BS operating on a first frequency, one or more signals on a second frequency including a cell ID, wherein the cell ID is selected by the first BS such that common reference signals (CRSs) transmitted from the first BS on the second frequency collide with CRSs transmitted from a second BS on the second frequency. For certain aspects, the UE may cancel interference on the received signals using interference cancellation algorithms to generate clean signals. The UE may then identify the first base station and its corresponding cell ID from the clean signals. At 804, the UE may handover from the second BS to the first BS based on the received cell ID.

Figure 9:
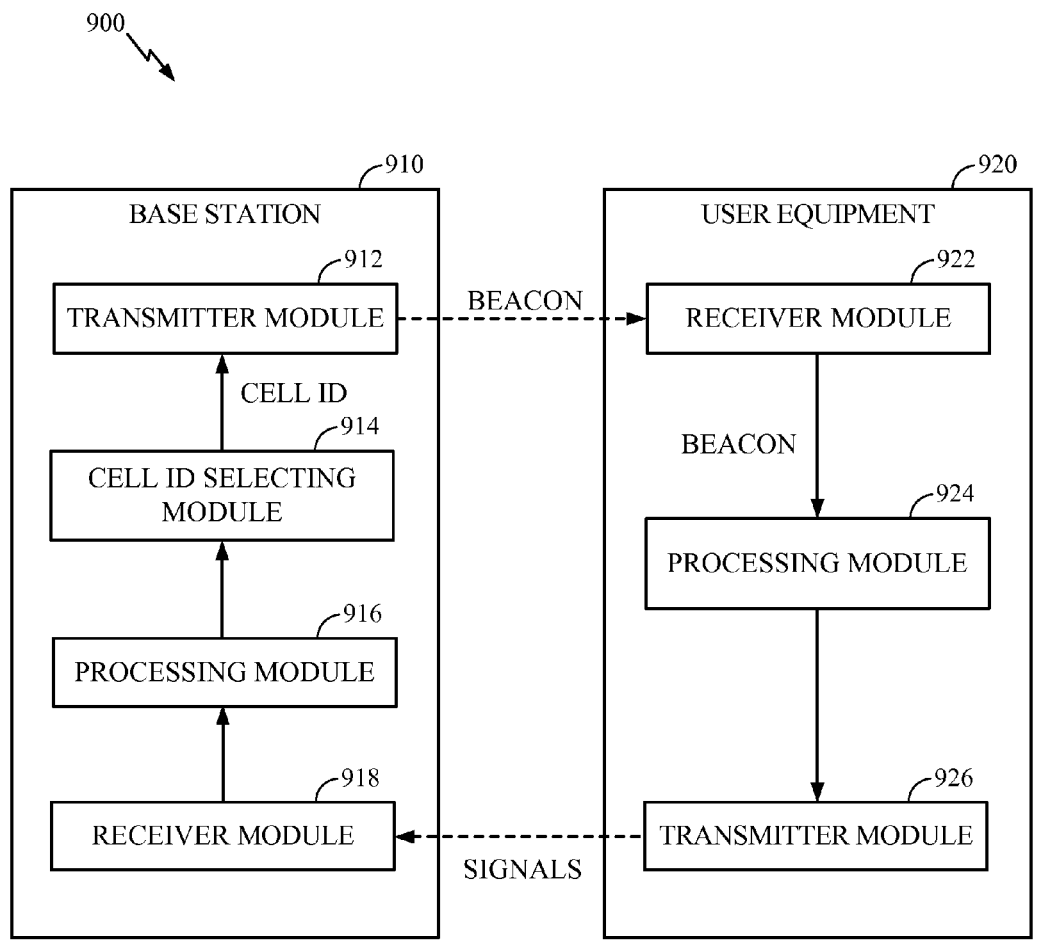
FIG. 9 illustrates an example network comprising a base station and a user equipment, in accordance with certain aspects of the present disclosure.

FIG. 9 illustrates an example network 900 comprising a base station and a user equipment, in accordance with certain aspects of the present disclosure. The base station 910 may receive signals from the UE 920 and/or other base stations in its vicinity (not shown) using receiver unit 918. The base station may process the received signals using the processing module 916. The base station may select a cell ID as described herein using the cell ID selecting module 914 and generate one or more beacon signals using the selected cell ID. The base station may then transmit the beacon signals using the transmitter module 912. The UE 920 may receive the beacon signals using the receiver module 922. The UE may then process the received beacon signals using the processing module 924 and determine that the base station is in its vicinity. The UE may then request to handover from its serving base station (not shown) to the base station 910 and transmit signals to the BS 910 using the transmitter module 926, if the handover request is accepted.

In summary, techniques described herein facilitate balancing load of a heterogeneous network by enabling a UE to become aware of other base stations in its vicinity and handing over to those neighboring BSs.

The various operations corresponding to blocks illustrated in the methods of FIGS. 4 and 8 described above may be performed by various hardware and/or software component(s) and/or module(s). For example, means for receiving or acquiring information regarding the second BS may be a receiver or any suitable receiving component (e.g., receiver 222 as shown in FIG. 2). Means for causing handover of a user equipment, means for synchronizing transmission of the one or more signals, means for utilizing MBSFN subframes and means for identifying one or more cell IDs may be any suitable processing component, such as a processor 230 as shown in FIG. 2. Means for selecting the cell ID may be any suitable processing component such as the cell ID selecting module 914 as illustrated in FIG. 9. Means for transmitting one or more signals and/or means for communicating may be any suitable transmitting component, such as the transmitter 222 as illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   by a first base station (BS) transmitting on a first frequency, selecting a cell identity (ID) for use in transmitting one or more signals on a second frequency, wherein the cell ID is selected such that common reference signals (CRSs) transmitted from the first BS on the second frequency will collide with CRSs transmitted from a second BS on the second frequency; and
   by the first BS, transmitting the one or more signals on the second frequency using the cell ID.

2. The method of claim 1, further comprising:
   causing a request for a handover of a user equipment (UE) associated with the second BS to the first BS based on the one or more signals.

3. The method of claim 2, further comprising:
   communicating with the UE by the first BS using the second frequency and the cell ID.

4. The method of claim 3, wherein communicating with the UE by the first BS using the second frequency and the cell ID includes causing interference to another UE using the second frequency that may be canceled using interference cancellation algorithms.

5. The method of claim 1, wherein the second BS is the strongest neighboring BS that operates on the second frequency, as indicated by one or more of measured reference signals, primary synchronization signals (PSS) or secondary synchronization signals (SSS).

6. The method of claim 5, further comprising:
synchronizing transmission of the one or more signals in time with transmissions from the second BS.

7. The method of claim 5, further comprising:
synchronizing transmission of the one or more signals in frequency with transmissions from the second BS.

8. The method of claim 1, wherein transmission of the one or more signals is at least one of periodic, aperiodic, or triggered by an event.

9. The method of claim 8, wherein the event comprises detection of a UE in proximity of the first BS.

10. The method of claim 1, wherein the one or more signals are transmitted in a manner to reduce transmit energy.

11. The method of claim 10, further comprising:
utilizing multimedia broadcast over single frequency network (MBSFN) subframes to transmit the one or more signals.

12. The method of claim 1, wherein selecting the cell ID for the first BS comprises:
identifying one or more cell IDs that are currently used by one or more neighboring BSs; and
selecting the cell ID for the first BS such that the cell ID is different from the one or more identified cell IDs.

13. The method of claim 12, wherein the one or more cell IDs are identified by at least one of network listening or backhaul network communication.

14. The method of claim 1, wherein the one or more signals comprise one or more of primary synchronization signal (PSS), secondary synchronization signal (SSS), physical broadcast channel (PBCH), CRS, or system information block (SIB).

15. The method of claim 1, further comprising:
receiving or acquiring information regarding the second BS, wherein the information comprises one or more of physical cell ID information, timing information or carrier frequency information.

16. An apparatus for wireless communications, comprising:
means for selecting, by a first base station (BS) transmitting on a first frequency, a cell identity (ID) for use in transmitting one or more signals on a second frequency, wherein the cell ID is selected such that common reference signals (CRSs) transmitted from the first BS on the second frequency will collide with CRSs transmitted from a second BS on the second frequency; and
means for transmitting, by the first BS, the one or more signals on the second frequency using the cell ID.

17. The apparatus of claim 16, further comprising:
means for causing a request for a handover of a user equipment (UE) associated with the second BS to the first BS based on the one or more signals.

18. The apparatus of claim 17, further comprising:
means for communicating with the UE by the first BS using the second frequency and the cell ID.

19. The apparatus of claim 18, wherein the means for communicating with the UE by the first BS using the second frequency and the cell ID is configured to cause interference to another UE using the second frequency that may be canceled using interference cancellation algorithms.

20. The apparatus of claim 16, wherein the second BS is the strongest neighboring BS that operates on the second frequency, as indicated by one or more of measured reference signals, primary synchronization signals (PSS) or secondary synchronization signals (SSS).

21. The apparatus of claim 20, further comprising:
means for synchronizing transmission of the one or more signals in time with transmissions from the second BS.

22. The apparatus of claim 20, further comprising:
means for synchronizing transmission of the one or more signals in frequency with transmissions from the second BS.

23. The apparatus of claim 16, wherein transmission of the one or more signals is at least one of periodic, aperiodic, or triggered by an event.

24. The apparatus of claim 23, wherein the event comprises detection of a UE in proximity of the first BS.

25. The apparatus of claim 16, wherein the one or more signals are transmitted in a manner to reduce transmit energy.

26. The apparatus of claim 25, further comprising:
means for utilizing multimedia broadcast over single frequency network (MBSFN) subframes to transmit the one or more signals.

27. The apparatus of claim 16, wherein the means for selecting the cell ID for the first BS is configured to:
identify one or more cell IDs that are currently used by one or more neighboring BSs; and
select the cell ID for the first BS such that the cell ID is different from the identified one or more cell IDs.

28. The apparatus of claim 27, wherein the one or more cell IDs are identified by at least one of network listening or backhaul network communication.

29. The apparatus of claim 16, wherein the one or more signals comprise one or more of primary synchronization signal (PSS), secondary synchronization signal (SSS), physical broadcast channel (PBCH), CRS, or system information block (SIB).

30. The apparatus of claim 16, further comprising:
means for receiving or acquiring information regarding the second BS, wherein the information comprises one or more of physical cell ID information, timing information or carrier frequency information.

31. An apparatus for wireless communications, comprising:
at least one processor configured to:
select, by a first base station (BS) transmitting on a first frequency, a cell identity (ID) for use in transmitting one or more signals on a second frequency, wherein the cell ID is selected such that common reference signals (CRSs) transmitted from the first BS on the second frequency will collide with CRSs transmitted from a second BS on the second frequency; and
transmit, by the first BS, the one or more signals on the second frequency using the cell ID; and
a memory coupled to the at least one processor.

32. A computer program product for wireless communications, comprising:
a computer-readable medium comprising code for:
selecting, by a first base station (BS) transmitting on a first frequency, a cell identity (ID) for use in transmitting one or more signals on a second frequency, wherein the cell ID is selected such that common reference signals (CRSs) transmitted from the first BS on the second frequency will collide with CRSs transmitted from a second BS on the second frequency; and transmitting, by the first BS, the one or more signals on the second frequency using the cell ID.

33. A method for wireless communications by a user equipment (UE), comprising:
receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency; and
performing a handover from the second BS to the first BS based on the received cell ID.

34. The method of claim 33, further comprising:
cancelling interference on the received one or more signals using interference cancellation algorithms to generate clean signals; and
identifying the first base station and its corresponding cell ID from the clean signals.

35. The method of claim 33, further comprising:
communicating with the first BS using the second frequency and the cell ID.

36. The method of claim 33, wherein the second BS is the strongest neighbor of the first BS that operates on the second frequency, as indicated by one or more of measured reference signals, primary synchronization signals (PSS) or secondary synchronization signals (SSS).

37. The method of claim 33, wherein the one or more signals are synchronized in time with transmissions from the second BS.

38. The method of claim 33, wherein the one or more signals are synchronized in frequency with transmissions from the second BS.

39. The method of claim 33, wherein the one or more signals are received aperiodically.

40. The method of claim 33, wherein the one or more signals are received in multimedia broadcast over single frequency network (MBSFN) subframes.

41. The method of claim 33, wherein the one or more signals comprise one or more of primary synchronization signal (PSS), secondary synchronization signal (SSS), physical broadcast channel (PBCH), CRS, or system information block (SIB).

42. An apparatus for wireless communications, comprising:
means for receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency; and
means for performing a handover from the second BS to the first BS based on the received cell ID.

43. The apparatus of claim 42, further comprising:
means for cancelling interference on the received one or more signals using interference cancellation algorithms to generate clean signals; and
means for identifying the first base station and its corresponding cell ID from the clean signals.

44. The apparatus of claim 42, further comprising:
means for communicating with the first BS using the second frequency and the cell ID.

45. The apparatus of claim 42, wherein the second BS is the strongest neighbor of the first BS that operates on the second frequency, as indicated by one or more of measured reference signals, primary synchronization signals (PSS) or secondary synchronization signals (SSS).

46. The apparatus of claim 42, wherein the one or more signals are synchronized in time with transmissions from the second BS.

47. The apparatus of claim 42, wherein the one or more signals are synchronized in frequency with transmissions from the second BS.

48. The apparatus of claim 42, wherein the one or more signals are received aperiodically.

49. The apparatus of claim 42, wherein the one or more signals are received in multimedia broadcast over single frequency network (MBSFN) subframes.

50. The apparatus of claim 42, wherein the one or more signals comprise one or more of primary synchronization signal (PSS), secondary synchronization signal (SSS), physical broadcast channel (PBCH), CRS, or system information block (SIB).

51. An apparatus for wireless communications, comprising:
at least one processor configured to:
receive, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency; and
perform a handover from the second BS to the first BS based on the received cell ID; and
a memory coupled to the at least one processor.

52. A computer program product for wireless communications, comprising:
a computer-readable medium comprising code for:
receiving, from a first base station (BS) operating on a first frequency, one or more signals on a second frequency including a cell identity (ID), wherein the cell ID is selected by the first BS such that common reference signals (CRSs) transmitted from the first BS on the second frequency collide with CRSs transmitted from a second BS on the second frequency; and
performing a handover from the second BS to the first BS based on the received cell ID.

* * * * *